(12) United States Patent
Barnet et al.

(10) Patent No.: US 10,203,984 B2
(45) Date of Patent: Feb. 12, 2019

(54) DATA STRUCTURE FOR MULTIPLE EXECUTABLE TASKS

(71) Applicant: SAP SE, Walldorf (DE)

(72) Inventors: Sonja Barnet, Viernheim (DE); Dirk Baumgaertel, Wiesloch (DE)

(73) Assignee: SAP SE, Walldorf (DE)

( * ) Notice: Subject to any disclaimer, the term of this patent is extended or adjusted under 35 U.S.C. 154(b) by 246 days.

(21) Appl. No.: 15/219,999

(22) Filed: Jul. 26, 2016

(65) Prior Publication Data

US 2018/0032370 A1 Feb. 1, 2018

(51) Int. Cl.
*G06F 9/46* (2006.01)
*G06F 9/48* (2006.01)
*G06F 17/30* (2006.01)

(52) U.S. Cl.
CPC ........ *G06F 9/4881* (2013.01); *G06F 17/3056* (2013.01); *G06F 17/30294* (2013.01)

(58) Field of Classification Search
None
See application file for complete search history.

(56) References Cited

U.S. PATENT DOCUMENTS

| | | | |
|---|---|---|---|
| 2004/0162742 A1* | 8/2004 | Stoker | G06Q 10/06 707/758 |
| 2006/0184940 A1* | 8/2006 | Urhan | G06F 11/1438 718/100 |
| 2017/0236221 A1* | 8/2017 | Davidson | G06Q 50/04 705/7.23 |

OTHER PUBLICATIONS

Nuttgens et al., Business Process Modeling with EPC and UML Transformation or Integration?, Heidelberg, 1998, pp. 250-261.*
Lubke, Transformation of Use Cases to EPC Models, Leibniz Universitat Hannover, 2006, pp. 137-156.*

* cited by examiner

*Primary Examiner* — Diem K Cao
(74) *Attorney, Agent, or Firm* — Buckley, Maschoff & Talwalkar LLC (57) ABSTRACT

A system, method, and computer-readable medium, including receiving a request to create a job chain, the job chain being a data structure and to reference a plurality of simple jobs; specifying the plurality of simple jobs referenced by the job chain, each of the simple jobs including at least one attribute defining an executable task for the simple job; specifying an order of execution for the plurality of simple jobs referenced by the job chain; and generating an instance of the job chain data structure, the generated job chain referencing the plurality of simple jobs and inheriting the at least one attribute of each of the plurality of simple jobs.

16 Claims, 9 Drawing Sheets

RECEIVE A REQUEST TO CREATE A JOB CHAIN, THE JOB CHAIN BEING A DATA STRUCTURE AND TO REFERENCE A PLURALITY OF SIMPLE JOBS
205

SPECIFY THE PLURALITY OF SIMPLE JOBS REFERENCED BY THE JOB CHAIN, EACH OF THE SIMPLE JOBS INCLUDING AT LEAST ONE PARAMETER DEFINING AN EXECUTABLE TASK FOR THE SIMPLE JOB
210

SPECIFY AN ORDER OF EXECUTION FOR THE PLURALITY OF SIMPLE JOBS REFERENCED BY THE JOB CHAIN
215

GENERATE AN INSTANCE OF THE JOB CHAIN DATA STRUCTURE, THE GENERATED JOB CHAIN REFERENCING THE PLURALITY OF SIMPLE JOBS AND INHERITING THE AT LEAST ONE PARAMETER OF EACH OF THE PLURALITY OF SIMPLE JOBS
220

| Parameter name |
|---|
| P_BUY_D |
| S_PLANT |

505 — P_BUY_D
510 — S_PLANT

| Parameter name |
|---|
| P_BUY_D |
| S_PLANT |
| P_BUY_C |
| P_INCR |

605 — Parameter name
610 — P_BUY_D
615 — P_BUY_C
620 — P_INCR

FIG. 6

| Parameter name | | Source job catalog | Source JC param. name | Fill by parameter name | |
|---|---|---|---|---|---|
| Name | Step | | | Name | Step |
| P_BUY_D | 1 | ZSUPP_2 | P_BUY_D | | |
| S_PLANT | 1 | ZSUPP_2 | S_PLANT | | |
| P_BUY_C | 1 | ZSUPP_2 | P_BUY_C | | |
| P_INCR | 1 | ZSUPP_2 | P_INCR | | |
| P_BUY_D | 2 | ZSUPP_1 | P_BUY_D | P_BUY_D | 1 |
| S_PLANT | 2 | ZSUPP_1 | S_PLANT | S_PLANT | 1 |

*FIG. 7*

| Parameter name | | Value |
| --- | --- | --- |
| Name | Step | |
| P_BUY_D | 1 | 06/27/2016 |
| S_PLANT | 1 | P1;P2 |
| P_BUY_C | 1 | X |
| P_INCR | 1 | 10 |

FIG. 8

| Parameter name | | Value |
| --- | --- | --- |
| Name | Step | |
| P_BUY_D | 1 | 06/27/2016 |
| S_PLANT | 1 | P1;P2 |
| P_BUY_C | 1 | X |
| P_INCR | 1 | 10 |
| P_BUY_D | 2 | 06/27/2016 |
| S_PLANT | 2 | P1;P2 |

| Parameter name | Value |
|---|---|
| P_BUY_D | 06/27/2016 |
| S_PLANT | P1;P2 |
| P_BUY_C | X |
| P_INCR | 10 |

| Parameter name | Value |
|---|---|
| P_BUY_D | 06/27/2016 |
| S_PLANT | P1;P2 |

DATA STRUCTURE FOR MULTIPLE EXECUTABLE TASKS

BACKGROUND

Enterprise software systems receive, generate, and store data related to many aspects of a business enterprise. This data may relate to sales, customer relationships, marketing, supplier relationships, inventory, human resources, and/or finances. Users operate reporting tools to access such data and display the data in useful formats, such as graphic visualizations and reports.

Reports related to the stored data may be generated relating to the tasks performed by a software application, service, and computing system or device of an organization. Some tasks may be straight-forward, including a single process or task that can be readily captured and expressed in different analytics and reports. In some contexts, software application(s), a service, a computing system, a device, and combinations thereof may be configured and implemented to execute a processor-executable task, wherein some aspects of the executed task can be included (i.e., "reported") in a report. However, some processes, actual or potential actualities, may comprise a plurality of different processor-executable tasks that might be performed repeatedly, even at intervals.

DETAILED DESCRIPTION

The following description is provided to enable any person in the art to make and use the described embodiments. Various modifications, however, will remain readily apparent to those in the art.

In some example contexts, use-cases, and embodiments, one or more application jobs (also referred to simply as "jobs" herein) may be executed when an application, service, system (e.g., server), or device is invoked and/or makes a call to or requests the execution of the application job. In some aspects, the jobs may execute or run in the background of an application, service, or system, without direct interaction with a user. For example, an invoicing process to create invoices for a business organization may be represented by a business object data structure and modeled by a developer or other entity. Parameters (e.g., variables, etc.) and other defining aspects of the modeled business object may be specified by metadata associated with the model thereof. Instances of the modeled invoice process may be generated with specific values for the parameters thereof, where the specific values might be obtained from a user and/or other applications or sources. In a like manner, other processes may be modeled and defined by associated metadata. For example, another background process might be a dunning process for sending reminder letters to customers having outstanding invoices.

In one example embodiment, background processing may be based, in large part, on reports that can be used by an organization to support their real-world operations. In some aspects, a simple job may be invoked to repeat periodically. For example, an organization may run an invoicing process once a month, although other time intervals may be possible.

While automatically running a simple job comprising a single task (e.g., create invoices, or generate a dunning letter, etc.) as a background application might be beneficial, some real-world challenges may involve processes including multiple steps or tasks. In some example embodiments herein, a process for creating and using jobs including a plurality of steps or tasks is disclosed. The jobs herein including a plurality of steps or tasks are referred to as job chains.

In some aspects, a job chain is a modeled data structure having associated metadata specifying attributes of the job chain. In some systems, a job catalog entry is based on a report and the job catalog entry is used to specify, in a job catalog, the different jobs available and possible for execution by a system or service. In some aspects, a job catalog entry may include attributes arranged in sections such as, for example, "header", "group", and "parameters". The header might include values for naming and specifying a type for a job, etc.; the group section might provide a mechanism for a developer to specify or define how certain parameters of the job can be grouped in a user interface (UI), etc.; and the parameters section may include a listing of the various parameters for a job and their associated values, etc. In some embodiments, a job catalog entry may be its own transport object that can be "shipped" with a report.

Figure 1:
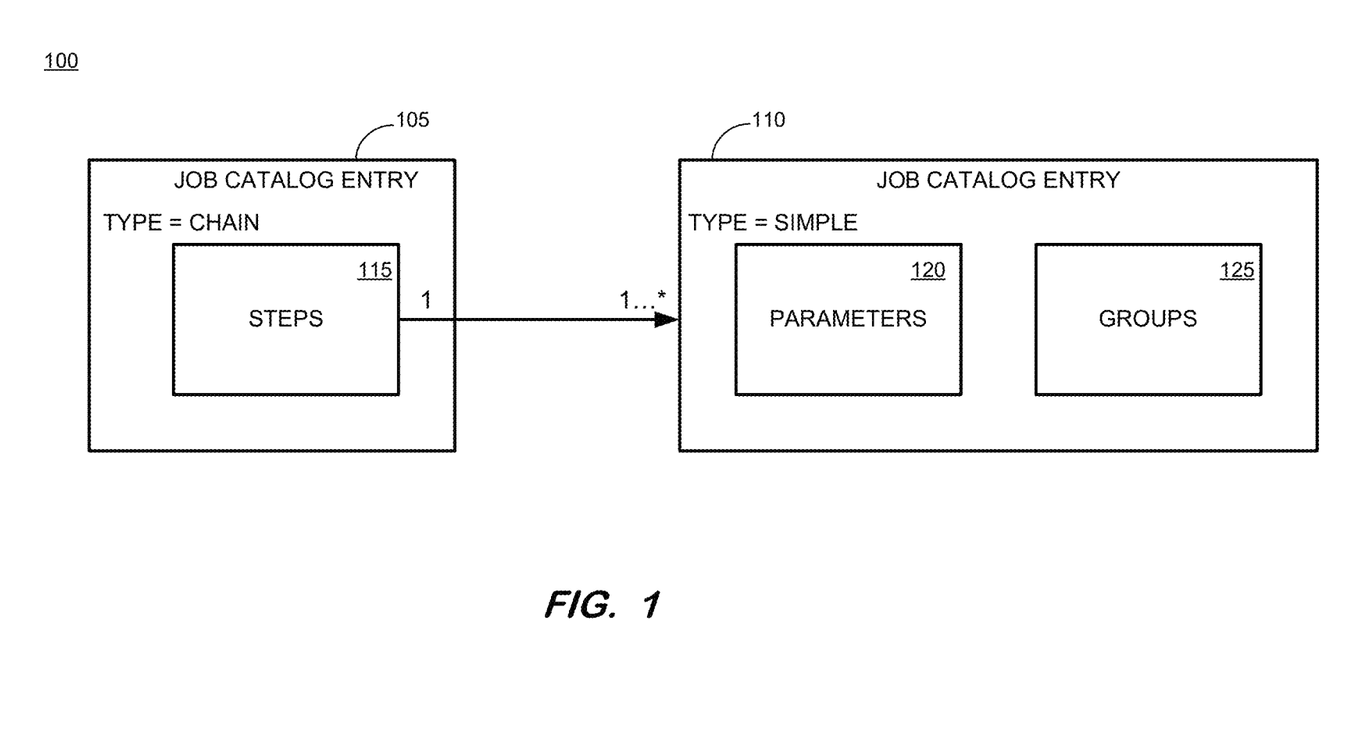
FIG. 1 is an example schematic embodiment of job catalog entries.

FIG. 1 is an illustrative schematic depiction 100 of job catalog entries, including a job catalog entry of the "chain" type 105 and a job catalog entry of the "simple" type 105. A chain type of job catalog entry 105 refers to a job chain including multiple steps, where each step refers to a job. A simple or basic job 110 includes a single/one task and includes defining aspects such as parameters and 120 and groups 125 to which the job may belong to. Regarding job category entries 105 and 110, each may be a modeled data structure having associated metadata defining the attributes thereof. For example, metadata for job chain 105 can specify the steps 115 comprising the job chain and metadata for simple job 110 can specify defining attributes such as, for example, parameters and groups for the job 110.

In some embodiments and aspects, a job chain type of job catalog entry includes a plurality of steps 115, where each step may be analogized to one link in a chain. Each step 115 in the job chain 105 refers to a simple job type of job catalog entry. Accordingly, one job chain 105 is associated with many, n, (at least two) simple jobs 110. Thus, there is a one-to-many relationship regarding a job chain and the simple jobs it references.

In some aspects, a job chain can be specified (i.e., the particular steps included in the job chain) by referencing (pre-) existing simple jobs. In this manner, a customer or other entity having access to a functionality or interface to define/specify a job chain can link multiple existing simple job catalog entries in a defined order. In some aspects, the entity defining the job chain as such might not need to be knowledgeable of or concerned with, for example, the parameters, code exits, and other aspects of the job chain since such aspects are already defined by the underlying or referenced simple jobs.

In some aspects, a simple job and a job chain can share a common or same metadata model. As such, a system implementing both the job chain and the simple job can propagate metadata maintained for the simple jobs referenced by a job chain to the job chain type of a job catalog entry. In another aspect, propagation of the metadata maintained for the simple jobs referenced by a job chain to the job chain can ensure a level of consistency between different job chains referencing at least some of the same simple jobs. For example, reports generated based on the execution of different job chains that include some of the same simple jobs might exhibit a consistency in the graphical layout and thus, user experience, for a user interacting with those reports.

In some example embodiments, a job chain catalog entry provides a mechanism for a user to rearrange (optionally) how parameters can be rendered on a UI. For example, a user might group some parameters propagated (i.e., inherited) from one or more referenced simple jobs in a configuration different from the grouping of those parameters in the underlying simple jobs. In this manner, for example, a report generated in response to the execution of the job chain may have a UI visualization that differs from reports that might be rendered due to the execution of the simple jobs underlying the job chain.

With reference to FIG. 1, an entity user defining a job chain 105 selects or otherwise specifies a job catalog entry of the simple job type for each step in the job chain. Parameters, groups, and possibly other aspects and attributes from the referenced simple job type of job catalog entry may be automatically pushed or propagated to the chain job catalog entry.

Figure 2:
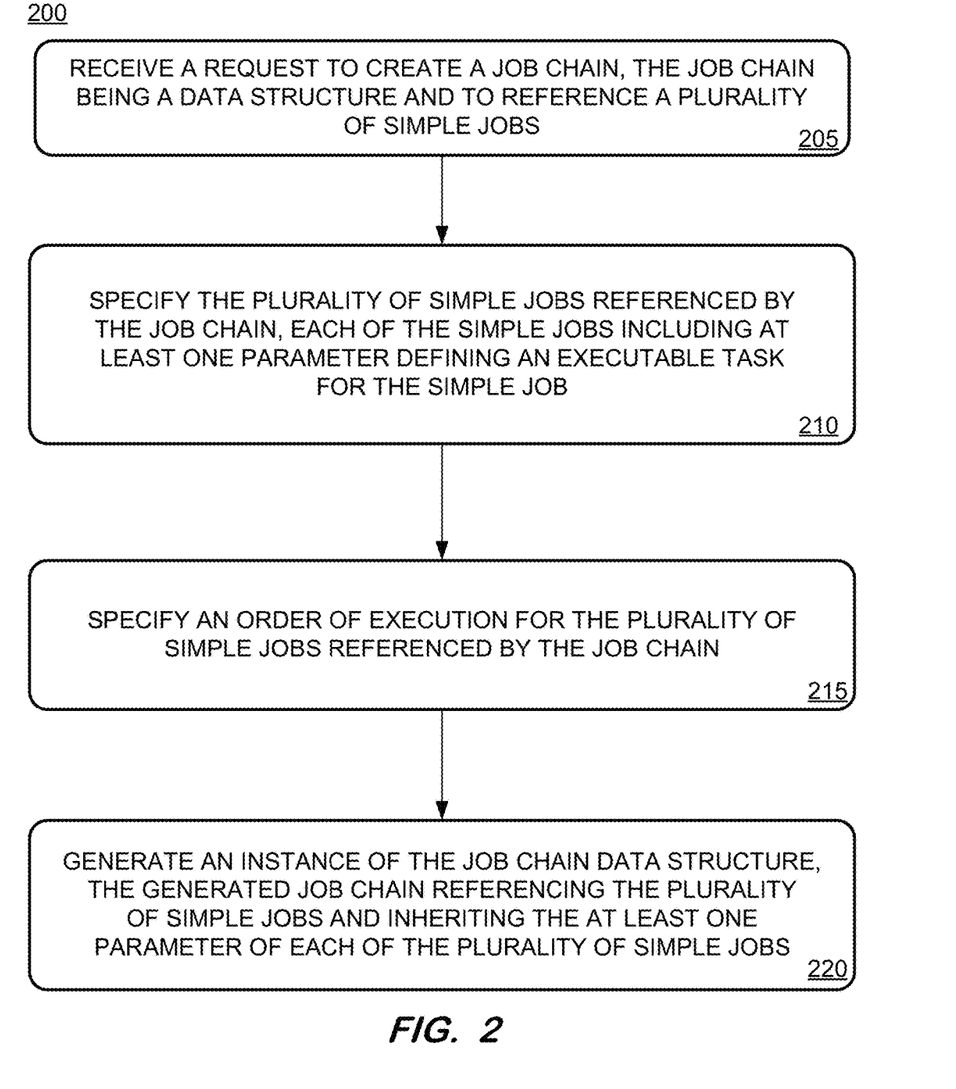
FIG. 2 is an example embodiment of an illustrative flow diagram of a process.

FIG. 2 is an example embodiment of a process 200 to create a job chain. At operation 205, a request to create a job chain is received. In some embodiments, the request is received by a system, device, server, service, application, or other device or apparatus implementing process 200 or portions thereof. In accordance with some embodiments herein, the job chain to be created is a data structure that will reference a plurality of simple jobs. In some aspects, a graphical user interface can be configured to provide a mechanism for a user (e.g., a developer or other entity) to submit the request to a system, service, or application having functionality to effectuate process 200 and aspects thereof.

Operation 210 can include specifying the plurality of simple jobs referenced by the job chain, where each of the simple jobs includes at least one attribute and/or parameter defining an executable task for the simple job. As used herein, an executable task may be any processor-executable instruction or feature, including but not limited to a generation or other processing aspects of a report.

Proceeding to operation 215, an order of execution for the plurality of simple jobs referenced by the job chain is specified. Operation 215 may be implemented in some embodiments by a graphical UI including UI elements to facilitate interfacing with a user to intake selection or specifications of a relative order for the jobs included in the job chain.

In some instances, the specified order may reflect dependencies between the jobs comprising a job chain. For example, a particular job, A, may need to start and/or complete execution before a next particular job, B, can be executed. As an example, the single act/task of sending invoices to customers of an organization may depend on the prior performance of other tasks such as, (1) determining whether ordered goods have shipped, (2) the creation of an invoice for the shipped goods, and (3) determining the mode of transmitting the invoice to be sent (e.g., fax, email, mail, etc.). These (and other) real-world dependencies can be reflected in a job chain by virtue of the specification of the multiple jobs and the particular order of those multiple jobs in a job chain.

In some aspects, the specification of an ordered sequence for the simple jobs comprising a job chain herein can be persisted and reused in the future, by a same or different overall process.

In some aspects, the parameters and other aspects or attributes and characteristics of a simple job that will be or is referenced by a job chain can be specified prior to the referenced simple (or basic) job being specified in a defining process for the job chain. In this manner, parameters and other attributes of the constituent simple jobs can be propagated to the job chain being created. In some instances, the propagation of attributes (e.g., parameters) from the simple job(s) to the job chain can be accomplished automatically without additional input from a user. In some use-cases, a user entity may alter (e.g., re-group) at least some of the attributes (e.g., parameters) from the simple job(s).

Continuing to operation 220, process 200 includes generating an instance of the job chain data structure, wherein the generated job chain references the plurality of simple jobs and inherits at least one attribute (e.g., a parameter, a configuration characteristic, etc.) of each of the plurality of simple jobs. The generated instance of the job chain may be persisted in a data store memory of a database management system, DBMS.

In some aspects, a job chain created by a process herein, including but not limited to process 200, can be persisted and used by an application, service, or system. For example, a created job chain can be scheduled for execution by a user via an application jobs scheduling app or service. In some aspects, a job chain created in accordance with some embodiments herein can have an associated label, flag, header, or other feature that indicates that it is a "job chain" to distinguish it from a simple job.

In some aspects herein, processing by a system, service, or device is performed based on tasks, where simple jobs include one task and a job chain includes multiple tasks. In some instances, at least some of the multiple tasks in a job chain can be repeated, none of the multiple tasks in a job chain repeat, and all of the multiple tasks in a job chain are different (i.e., none repeat).

In some instances, one or more simple jobs in a job chain may be executed in parallel, at least partially.

Figure 3:
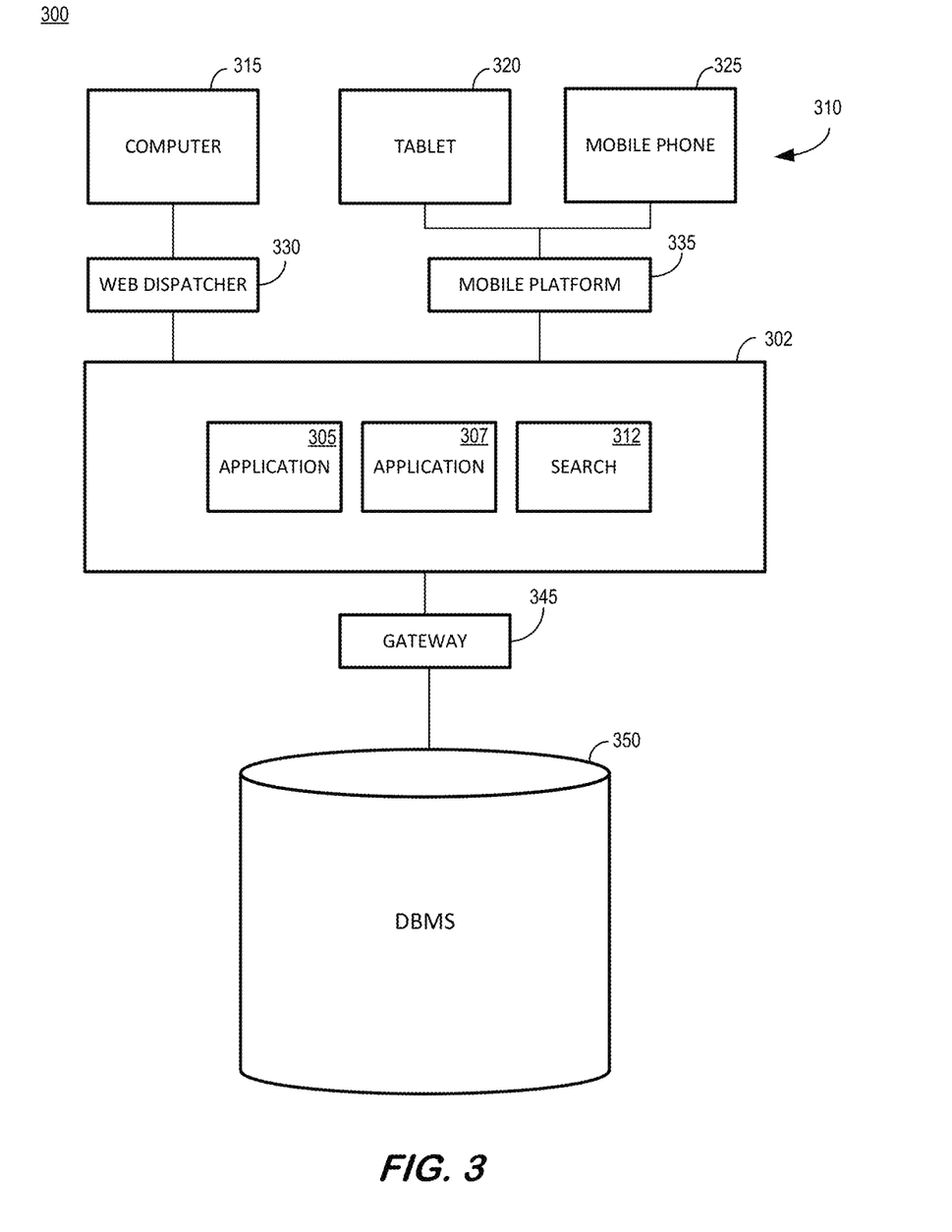
FIG. 3 is an embodiment of a system architecture.

FIG. 3 is an illustrative example embodiment of a system architecture for creating, monitoring, and scheduling of a job chain herein. Embodiments of the present disclosure are not limited to the particular architecture 300 shown in FIG. 3 or to a database architecture.

Architecture 300 includes a platform 302 supporting and facilitating one or more applications 305, 307 and services (e.g., search service 312). Application 305 may be newly created in accordance with some aspects of the present disclosure to add or enhance a functionality to system 300 to create a job chain as disclosed herein. System 300 may include a frontend 310 that can include one or more of a computer 315 running a browser and mobile devices such as a tablet 320 and a mobile phone 325 that can execute a browser and/or run an application (i.e., and "app"). In some aspects, the app may be separately and independently deployed to one or more of the frontend devices or it may be native to some of those devices. In some embodiments, the devices of the frontend 310 may differ from the particular devices shown in FIG. 3. Of note, the devices in the frontend 310 maybe different from each other and demonstrate that system 300, including platform 302 and a backend system represented by a DBMS 350 may be device-agnostic. Each of the devices in the frontend 310 may render a UI that is consistently themed for the applications 305, 307 running on platform 302. Communication between the frontend devices and platform 302 may be facilitated by web dispatcher 330 and mobile platform 335, which provide an appropriate communication interface depending on the frontend device.

System 300 further includes a gateway service 345 that can provide a mechanism for communicating with DBMS 350. In some instances, gateway service 345 or an instance thereof may be newly created to facilitate and support a creation of a job chain herein.

Applications 305, 307 and services 312 may include server-side executable instructions (e.g., program code such as, for example, compiled code, scripts, etc.) that can provide functionality to applications executing on frontend devices 315, 320, 325 by providing user interfaces thereto, receiving requests (e.g., create a job chain) from those applications and communicating with application 305, retrieving data (pre-existing simple jobs and their associated metadata) from a data store of DBMS 350 based on the requests, processing the data received from DBMS 350, storing some of the processed data on DBMS 350, providing access to the processed data (e.g., generated instance of a job chain) to application 305, and presenting visualizations of the processed data (e.g., the generated job chain) for use by another application. For example, application 307 may be executed to schedule the execution of the newly generated job chain.

Figure 4:
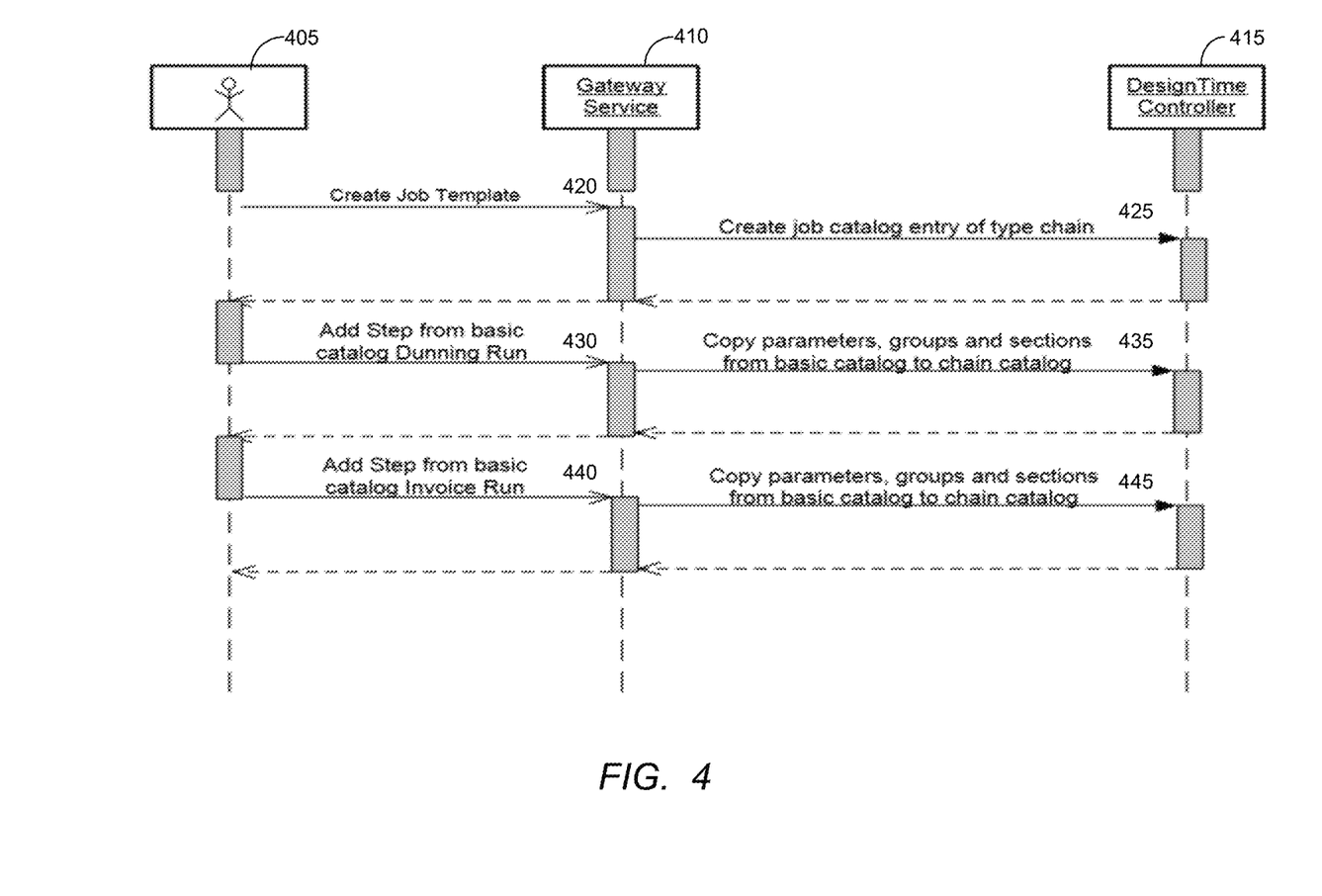
FIG. 4 is an example embodiment of a flow diagram.

FIG. 4 is an example flow diagram 400 of a process to create a job chain as disclosed in some aspects herein, from a user's point of view. Flow diagram illustrates operational flows between three entities, namely a user 405 that may be interacting with an application or service via a UI rendered on a processor-enable device, a gateway service 410 that may facilitate communication with a backend system supporting a processing platform and/or applications and services having some of the functionality disclosed herein, and a design time controller 415 in the backend. At 420, user 405 sends a request to create a job template to gateway service 410 that in turn forwards a request to create a job catalog entry of the job chain type to controller 415. Design time controller (or another device or system so enabled) creates the job catalog entry of the job chain type.

After creation of the job catalog entry of the job chain type, a visualization of the created job catalog entry of the job chain type can be presented to user 405. In reply, user 405 may select the presented job chain type of job catalog entry via a UI of the device and add a step to the job chain. In accordance with other aspects herein, each step being specified by user 405 to add to the job chain can be a basic or simple job persisted in a basic catalog, as shown at 430. In response to the addition of the step to the job chain at 430 by user 405, a copy of the parameters and other attributes (e.g., groups, sections, etc.) can be sent to the design time controller 415 from gateway service 410. For example, the user may request that the job chain being created include the step of a "Dunning Run". In this manner, the attributes of the step(s) underlying the job chain can be propagated to the job chain itself.

The controller 415 may provide, via gateway service 410 and a UI visualization, an indication or confirmation that the step added at 430 was actually added to the job chain. In reply thereto, at 440 the user may select another (or the same) basic job from the job catalog via a UI of their device to add another step (e.g., an "Invoice Run") to the job chain. In response to the addition of this additional step to the job chain at 440, a copy of the parameters and/or other attributes (e.g., groups, sections, etc.) of this second step can be sent to the design time controller 415 from gateway service 410 and persisted by the backend of the implementing system.

In some regards, additional and alternate steps may be added to the job chain in a similar manner to those shown in FIG. 4 until the job chain being created includes all of the desired steps (i.e., jobs).

FIGS. 5-11 each demonstrate some aspect of example user interfaces that may be used to effectuate and/or visualize the creation of a job chain based on underlying simple jobs, in accordance with some aspects herein. An example including FIGS. 5-11 relates to two existing simple jobs that occupy job catalog entries in a job catalog herein. In the present example, the two jobs include a Dunning Run simple job and an Invoice Run simple job, where each includes just one step/task. FIGS. 5-11 convey, in some embodiments, an outward view of a displayed user interface or a portion thereof.

Figure 5:
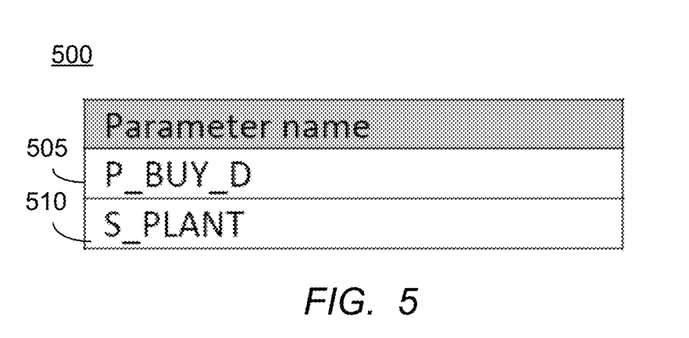
FIG. 5 is an example of job catalog parameters.

FIG. 5 is an outward view of a displayed UI 500 or a portion thereof. The UI 500 includes a parameter listing for a job catalog entry of the simple job type. In this example, this first simple job, "ZSUPP_1" is an "Invoice Run" and has two parameters 505, 510 with the names as shown.

Figure 6:
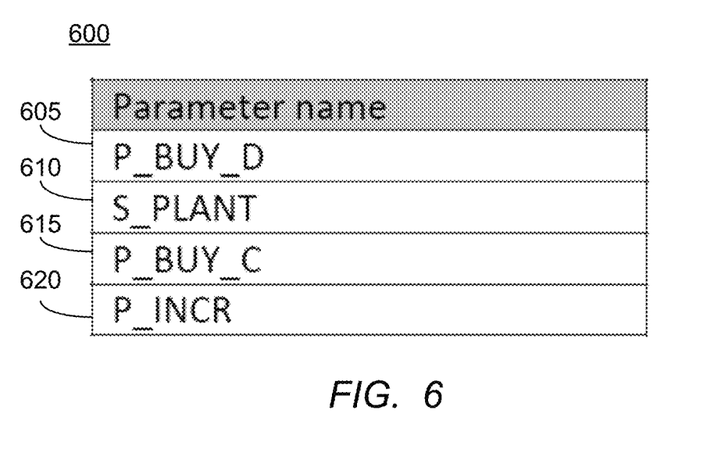
FIG. 6 is an example of another job catalog's parameters.

FIG. 6 is an outward view of a displayed UI 600 or a portion thereof. UI 600 includes a parameter listing for a job catalog entry of the simple job type. In the present example, this second simple job, "ZSUPP_2" is a "Dunning Run" task and has four parameters 605, 610, 615, and 620 with the names as shown.

In some instances, a job chain can include a simple or basic job more than once. As such, some embodiments herein can include an alias to identify and differentiate each usage of a simple job in a job chain. All of the "steps" have a unique name and refer to a basic/simple job catalog entry.

In the example of FIGS. 5-11, an alias is represented as a "step" used in conjunction with the simple job's name to identify each usage of the simple jobs. For example, FIG. 7 includes an outward view of a displayed UI 700 or a portion thereof. UI 700 includes a tabular parameter listing for a job catalog entry of the job chain type including the simple job "Invoice Run" and the "Dunning Run" simple job. Accordingly, UI 700 lists parameters for the "Dunning Run" job (i.e., "ZSUPP_2") at 715, 720, 725, and 730 and lists parameters for the "Invoice Run" simple job (i.e., "ZSUPP_1") at 735 and 740. UI 700 further includes columns for listing the source job catalog at 702, the source job catalog parameter name (if any) at 704, and the parameter name used to fill a parameter (if needed) as shown at 706 and 708.

Figure 7:
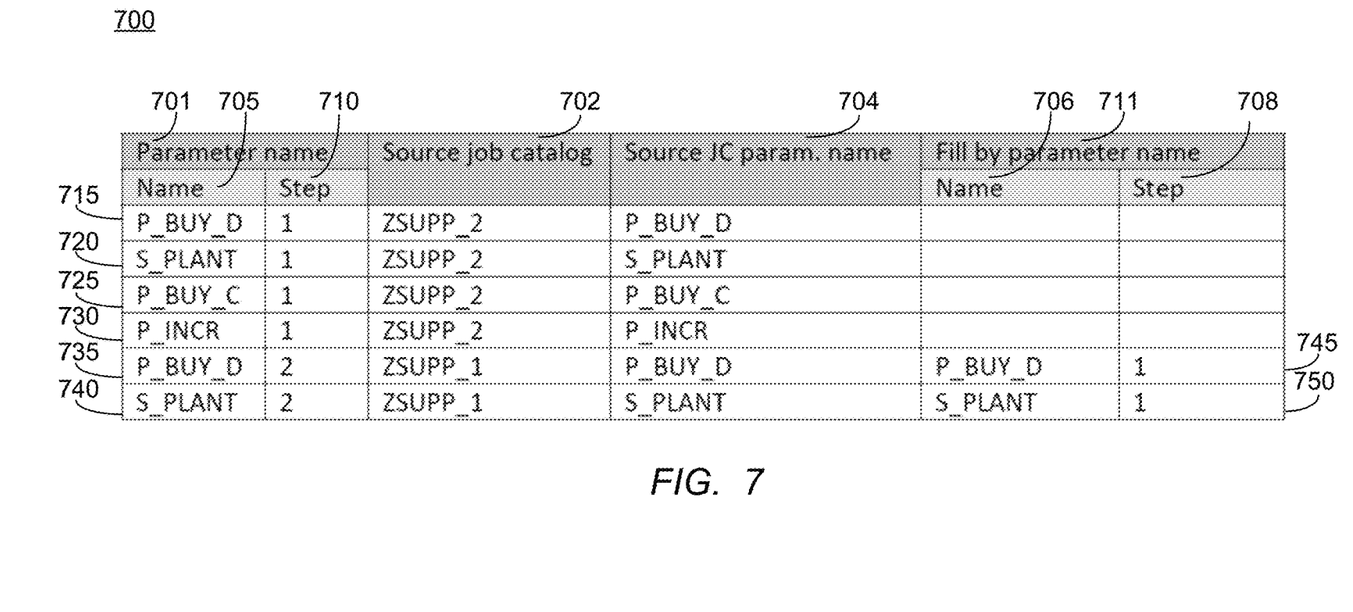
FIG. 7 is an example of job catalog parameters for a job chain.

Referring to FIG. 7 still, it is seen that the use of aliases in the present example results in compound parameter names. The parameter names 701 include a name and a step. For example, the parameter listed at 715 has the name of "P_BUY_D, Step 1" and the parameter listed at 735 has the name of "P_BUY_D, Step 2". The addition of the step designator differentiates each usage of the "P_BUY_D" from the other.

In the example of FIGS. 5-11, the basic or simple job catalog ZSUPP_1 and ZSUPP_2 both have a parameter "P_BUY_D" and "S_PLANT". In some embodiments, a default behaviour of a system is to add all attributes and/or parameters of the basic job catalog to the job chain catalog.

In some use-cases, it may be the case that the same attributes and/or parameters from different catalog entries are filled differently (i.e., have different values), but in general it may be assumed that they should have the same values. For some such cases, the present disclosure offers a mechanism to define a parameter as depending on another parameter. This aspect is seen in UI 700 at 711 where the name 706 and step 708 can be specified for a parameter depending on another parameter.

In the example of FIG. 7, the job chain parameters "P_BUY_D 2" (735) and "S_PLANT 2" (740) depend from "P_BUY_D 1" and "S_PLANT 1" and this dependency is specified at 745 and 750. In some regards, this means that on the UI the parameters "P_BUY_D 2" and "S_PLANT 2" will be hidden on a parameter screen UI and the system will automatically distribute the parameter values according to the specified dependency.

Figure 8:
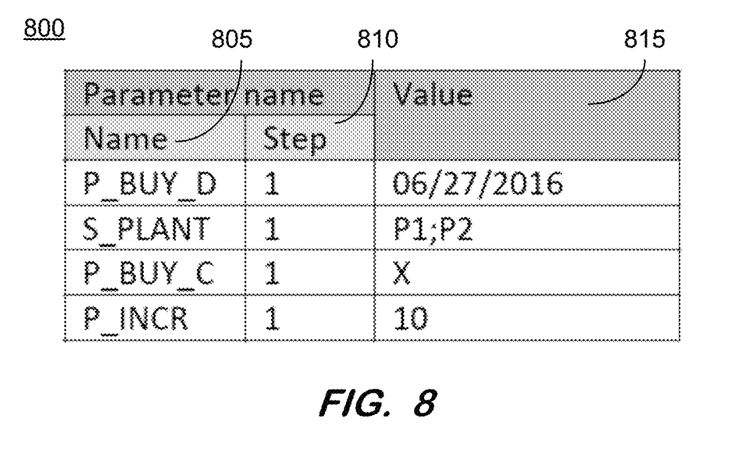
FIG. 8 is an example of job catalog parameters and values for a job.

FIGS. 8-11 more particularly relate to a parameter value distribution process in some embodiments herein. FIG. 8 includes an outward view of a displayed UI 800 or a portion thereof. UI 800 includes a tabular parameter listing for parameters named as indicated at 805 and 810 and their corresponding values are shown at 815. The values in the table in FIG. 8 can be specified by a user interacting with UI 800.

Figure 9:
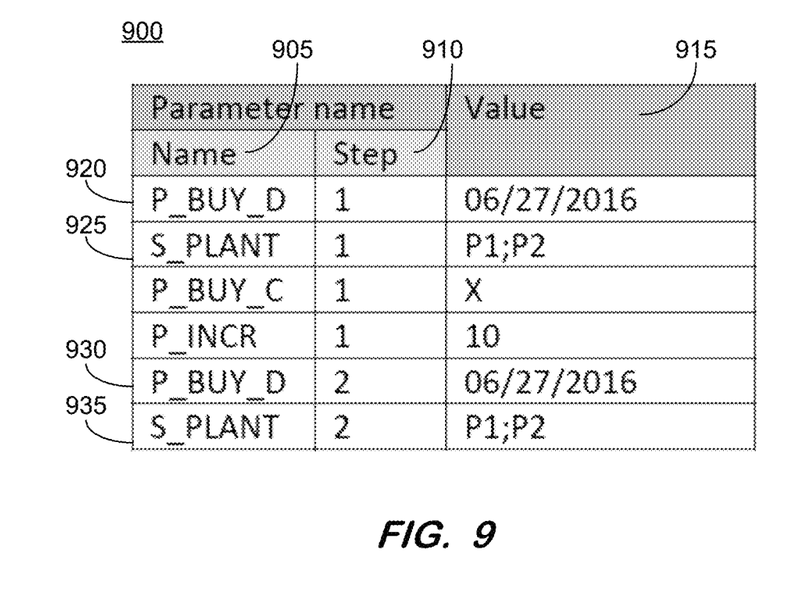
FIG. 9 is an example of job catalog parameters and values for a job chain.

FIG. 9 includes an outward view of a displayed UI 900 or a portion thereof. UI 900 includes a tabular parameter listing for the parameters and their corresponding values for a job chain. The table listed in FIG. 9 may result from the creation of a job chain (e.g., in reply to an invocation or triggering by a user, etc.). In particular, the parameter-value listing of UI 900 corresponds to the job chain parameter listing shown in FIG. 7 in UI 700. As seen in UI 900, the system distributes the parameter values to the dependent job chain parameters as specified in the table of FIG. 7.

Figure 10:
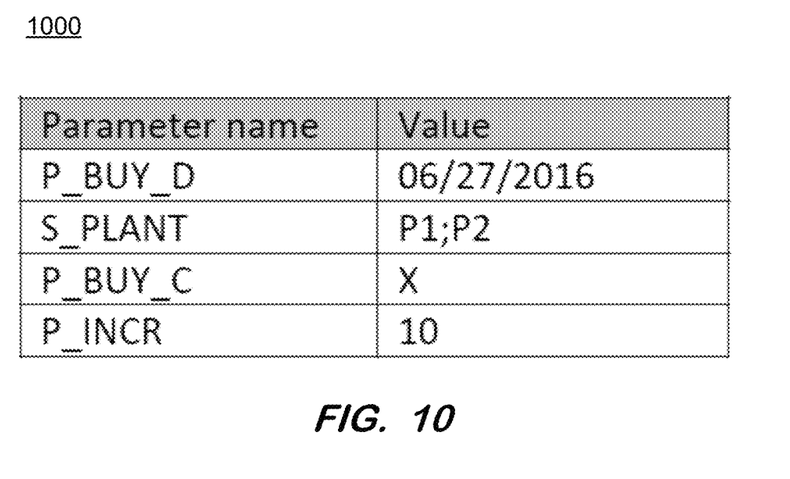
FIG. 10 is an example of job catalog parameters and values for a job.
Figure 11:
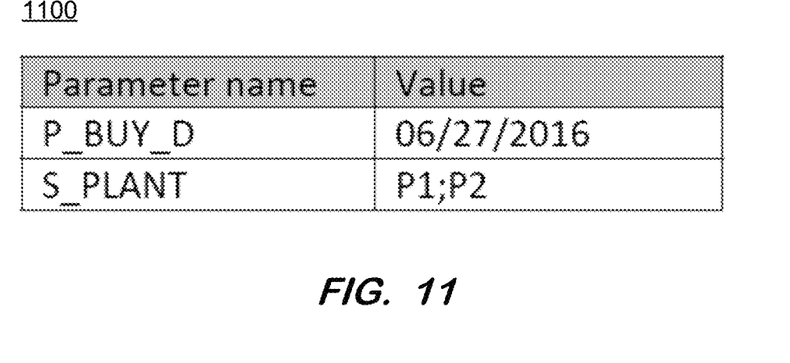
FIG. 11 is an example of job catalog parameters and values for a job.

FIGS. 10 and 11 illustrate how an implementing system might distribute the job parameter values from the job chain to the underlying basic/simple job catalogs, in light of the values and dependencies specified by the user in the present example.

In some aspects, after the parameter vales are distributed to the underlying job catalog entries as shown in FIGS. 10 and 11 in UIs 1000 and 1100, a system can create, for example, report variants based thereon, invoke a job scheduling framework/application to use the now defined values, and other processes, applications, and use-cases.

Figure 12:
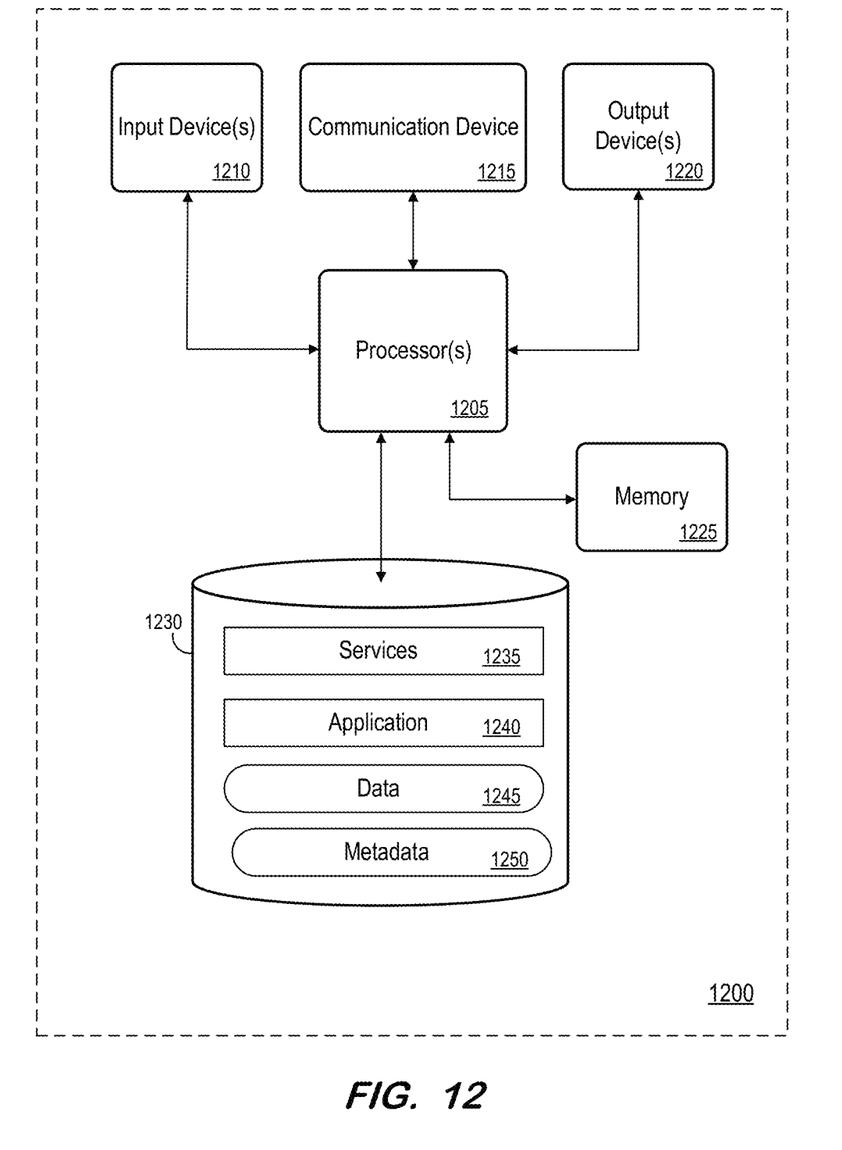
FIG. 12 is a block diagram of an apparatus, according to some embodiments.

FIG. 12 is a block diagram of apparatus 1200 according to some embodiments. Apparatus 1200 may comprise a computing apparatus and may execute program code to perform any of the functions described herein. Apparatus 1200 may comprise an implementation of server supporting an application (e.g., 305, 307), DBMS 350, and data store of FIG. 1 in some embodiments. Apparatus 1200 may include other unshown elements according to some embodiments.

Apparatus 1200 includes processor 1205 operatively coupled to communication device 1220, data storage device 1230, one or more input devices 1210, one or more output devices 1220 and memory 1225. Communication device 1215 may facilitate communication with external devices, such as a reporting client, or a data storage device. Input device(s) 1210 may comprise, for example, a keyboard, a keypad, a mouse or other pointing device, a microphone, knob or a switch, an infra-red (IR) port, a docking station, and/or a touch screen. Input device(s) 1210 may be used, for example, to enter information into apparatus 1200. Output device(s) 1220 may comprise, for example, a display (e.g., a display screen) a speaker, and/or a printer.

Data storage device 1230 may comprise any appropriate persistent storage device, including combinations of magnetic storage devices (e.g., magnetic tape, hard disk drives and flash memory), optical storage devices, Read Only Memory (ROM) devices, etc., while memory 1225 may comprise Random Access Memory (RAM), Storage Class Memory (SCM) or any other fast-access memory.

Services 1235, application 1240, and DBMS 1245 may comprise program code executed by processor 1205 to cause apparatus 1200 to perform any one or more of the processes described herein. Embodiments are not limited to execution of these processes by a single apparatus.

Data 1250 and metadata 1250 (either cached or a full database) may be stored in volatile memory such as memory 1225. Metadata 1250 may include information regarding parameters, groups, sections, and other attributes of simple jobs and job chains. Data storage device 1230 may also store data and other program code and instructions for providing additional functionality and/or which are necessary for operation of apparatus 1200, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a memory storing processor-executable instructions; and
   a processor to execute the processor-executable instructions to cause the system to:
   receive a request to create a job chain, the job chain being a data structure and to reference a plurality of simple jobs, each of the simple jobs being an executable application task having associated metadata conforming to a metadata model and specifying at least one attribute of each respective simple job;

specify the plurality of simple jobs referenced by the job chain, the job chain conforming to the same metadata model as the referenced plurality of simple jobs;

specify an order of execution for the plurality of simple jobs referenced by the job chain; and generate an instance of the job chain data structure, the generated job chain referencing the plurality of simple jobs and automatically inheriting at least one attribute of each of the plurality of simple jobs referenced by the job chain.

2. The system of claim 1, further comprising specifying at least one dependency to coexist between the plurality of simple jobs, wherein the order specified for the plurality of simple jobs referenced by the job chain is based, at least in part, on the specified at least one dependency between the plurality of simple jobs.

3. The system of claim 1, wherein each of the plurality of simple jobs is a preexisting data structure.

4. The system of claim 1, wherein the at least one attribute of each simple job defines the executable application task associated with each of the plurality of simple jobs.

5. The system of claim 1, wherein the at least one attribute of each of the plurality of simple jobs automatically inherited by the job chain is represented as metadata associated with the generated job chain data structure.

6. The system of claim 1, wherein the instance of the job chain data structure is automatically generated in response to the specifying of the order of execution for the plurality of simple jobs referenced by the job chain.

7. The system of claim 1, wherein at least two of the plurality of simple jobs are different from each other.

8. The system of claim 1, wherein at least one of the plurality of simple jobs represents a report.

9. A computer-implemented method, the method comprising:

receiving a request to create a job chain, the job chain being a data structure and to reference a plurality of simple jobs, each of the simple jobs being an executable application task having associated metadata conforming to a metadata model and specifying at least one attribute of each respective simple job;

specifying the plurality of simple jobs referenced by the job chain, the job chain conforming to the same metadata model as the referenced plurality of simple jobs, the specifying including an alias to identify and differentiate each usage of a simple job in the job chain;

specifying an order of execution for the plurality of simple jobs referenced by the job chain; and generating an instance of the job chain data structure, the generated job chain referencing the plurality of simple jobs and automatically inheriting at least one attribute of each of the plurality of simple jobs referenced by the job chain.

10. The method of claim 9, further comprising specifying at least one dependency to coexist between the plurality of simple jobs, wherein the order specified for the plurality of simple jobs referenced by the job chain is based, at least in part, on the specified at least one dependency between the plurality of simple jobs.

11. The method of claim 9, wherein each of the plurality of simple jobs is a preexisting data structure.

12. The method of claim 9, wherein the at least one attribute of each simple job defines the executable application task associated with each of the plurality of simple jobs.

13. The method of claim 9, wherein the at least one attribute of each of the plurality of simple jobs automatically inherited by the job chain is represented as metadata associated with the generated job chain data structure.

14. The method of claim 9, wherein the instance of the job chain data structure is automatically generated in response to the specifying of the order of execution for the plurality of simple jobs referenced by the job chain.

15. The method of claim 9, wherein at least two of the plurality of simple jobs are different from each other.

16. The method of claim 9, wherein at least one of the plurality of simple jobs represents a report.

\* \* \* \* \*